(12) United States Patent
Wills

(10) Patent No.: US 12,373,930 B2
(45) Date of Patent: Jul. 29, 2025

(54) COMPUTATIONAL HEURISTIC ENCODER ENHANCEMENT RELAY SYSTEM

(71) Applicant: BNSF Railway Company, Fort Worth, TX (US)

(72) Inventor: Corey D. Wills, Berryton, KS (US)

(73) Assignee: BNSF Railway Company, Fort Worth, TX (US)

( * ) Notice: Subject to any disclaimer, the term of this patent is extended or adjusted under 35 U.S.C. 154(b) by 427 days.

(21) Appl. No.: 18/062,254

(22) Filed: Dec. 6, 2022

(65) Prior Publication Data
US 2023/0096667 A1    Mar. 30, 2023

Related U.S. Application Data

(63) Continuation-in-part of application No. 17/810,441, filed on Jul. 1, 2022, now Pat. No. 11,842,476, which
(Continued)

(51) Int. Cl.
*G06T 7/11*      (2017.01)
*B61K 9/08*      (2006.01)
(Continued)

(52) U.S. Cl.
CPC .............. *G06T 7/0004* (2013.01); *B61K 9/08* (2013.01); *G06F 18/2431* (2023.01);
(Continued)

(58) Field of Classification Search
CPC ....... G06T 7/0004; G06T 7/11; G06T 1/0007; G06T 1/0014; G06T 2207/20132;
(Continued)

(56) References Cited

U.S. PATENT DOCUMENTS

| | | |
|---|---|---|
| 17,911 A | 7/1857 | White |
| 70,283 A | 10/1867 | Staley |

(Continued)

FOREIGN PATENT DOCUMENTS

| | | |
|---|---|---|
| CN | 202533046 U | 11/2012 |
| CN | 102954191 A | 1/2013 |

(Continued)

OTHER PUBLICATIONS

Santur et al. "Random forest based diagnosis approach for rail fault inspection in railways," 2016 National Conference on Electrical, Electronics and Biomedical Engineering, Dec. 1-3, 2016, pp. 745-750.
(Continued)

*Primary Examiner* — Ali Bayat
(74) *Attorney, Agent, or Firm* — Whitaker Chalk Swindle & Schwartz PLLC; Enrique Sanchez, Jr.

(57) ABSTRACT

Methods and systems for filtering a trigger signal from an encoder for triggering an image capturing device. In embodiments, a trigger signal may be received as an input signal from an encoder including a sequence of pulses for triggering the image capturing device. In embodiments, an average pulse frequency of the trigger signal over a period of time may be determined based on sampling a number of pulses in the trigger signal over the period of time, and frequency restrictions may be applied to the average pulse frequency to generate a trigger frequency. In embodiments, an output frequency may be determined based on the trigger frequency, and a pulse width modulation (PWM) signal having a frequency based on the output frequency may be determined for triggering the image capturing device.

20 Claims, 4 Drawing Sheets

Related U.S. Application Data is a continuation of application No. 17/719,811, filed on Apr. 13, 2022, now Pat. No. 11,423,527, which is a continuation-in-part of application No. 17/194,954, filed on Mar. 8, 2021, now Pat. No. 11,620,743, which is a continuation of application No. 16/196,990, filed on Nov. 20, 2018, now Pat. No. 10,984,521.

(51) Int. Cl.
　　*G06F 18/2431*　　(2023.01)
　　*G06N 20/00*　　(2019.01)
　　*G06T 7/00*　　(2017.01)
　　*G06V 10/12*　　(2022.01)
　　*G06T 1/00*　　(2006.01)

(52) U.S. Cl.
　　CPC ............... *G06N 20/00* (2019.01); *G06T 7/11* (2017.01); *G06V 10/12* (2022.01); *G06T 1/0007* (2013.01); *G06T 1/0014* (2013.01); *G06T 2207/20132* (2013.01)

(58) Field of Classification Search
　　CPC ...... B61K 9/08; G06F 18/2431; G06N 20/00; G06V 10/12; B61L 15/0081; B61L 23/04; H04N 23/60; H04N 23/68
　　USPC .......................................................... 382/141
　　See application file for complete search history.

(56) References Cited

U.S. PATENT DOCUMENTS

| | | | |
|---|---|---|---|
| 88,091 | A | 4/1869 | McMahen |
| 122,569 | A | 1/1872 | Chute |
| 140,509 | A | 7/1873 | Knox |
| 171,704 | A | 1/1876 | Swinburn |
| 196,456 | A | 10/1877 | Howard |
| 304,083 | A | 8/1884 | Edison |
| 4,558,379 | A | 12/1985 | Hutter et al. |
| 5,068,912 | A | 11/1991 | Concannon et al. |
| 6,201,361 | B1 * | 3/2001 | Muller ............. G07B 17/00467 318/540 |
| 6,955,145 | B1 * | 10/2005 | McCabe ................. F01L 1/022 123/90.31 |
| 7,200,259 | B1 | 4/2007 | Gold et al. |
| 7,616,329 | B2 | 11/2009 | Mllar et al. |
| 7,755,660 | B2 | 7/2010 | Nejikovsky et al. |
| 7,860,640 | B1 | 12/2010 | Wall, III |
| 8,405,837 | B2 | 3/2013 | Nagle et al. |
| 8,958,079 | B2 | 2/2015 | Kainer et al. |
| 9,628,762 | B2 | 4/2017 | Farritor |
| 9,771,090 | B2 | 9/2017 | Warta et al. |
| 10,009,197 | B1 | 6/2018 | Magee et al. |
| 2001/0016061 | A1 | 8/2001 | Shimoda et al. |
| 2002/0075777 | A1 | 6/2002 | Kuwaoka et al. |
| 2002/0186916 | A1 | 12/2002 | Bessios |
| 2005/0002558 | A1 | 1/2005 | Franke et al. |
| 2005/0190414 | A1 * | 9/2005 | Walde ...................... H04N 1/04 358/487 |
| 2005/0273218 | A1 * | 12/2005 | Breed ................ G06K 7/10178 701/2 |
| 2006/0025897 | A1 * | 2/2006 | Shostak ............. G06K 19/0717 701/1 |
| 2008/0086258 | A1 | 4/2008 | Wall |
| 2012/0300060 | A1 | 11/2012 | Farritor |
| 2013/0190981 | A1 | 7/2013 | Donilar et al. |
| 2013/0270899 | A1 | 10/2013 | Buttolo et al. |
| 2014/0263652 | A1 | 9/2014 | Auger |
| 2015/0254853 | A1 | 9/2015 | Tanaka et al. |
| 2015/0271201 | A1 | 9/2015 | Ruvio et al. |
| 2016/0104061 | A1 | 4/2016 | McGill |
| 2016/0231253 | A1 | 8/2016 | Nygaard et al. |
| 2017/0061623 | A1 | 3/2017 | Jaehnisch et al. |
| 2017/0106885 | A1 | 4/2017 | Singh |
| 2019/0346088 | A1 | 11/2019 | Xiong et al. |
| 2019/0367061 | A1 * | 12/2019 | Mesher ................... G01S 19/45 |
| 2020/0019938 | A1 | 1/2020 | Wang et al. |
| 2020/0086903 | A1 * | 3/2020 | Mesher ................. B61L 23/045 |
| 2020/0175352 | A1 | 6/2020 | Cha et al. |

FOREIGN PATENT DOCUMENTS

| | | |
|---|---|---|
| GB | 2368400 A | 1/2002 |
| JP | 2008502538 A | 1/2008 |
| JP | 2010139317 A | 6/2010 |
| JP | 2008505260 A | 4/2011 |
| JP | 20102026982 A | 2/2012 |
| JP | 2015178978 A | 10/2015 |
| JP | 2018005640 A | 1/2018 |
| JP | 2016109495 A | 10/2018 |
| JP | 2017187487 A | 3/2021 |
| WO | 2006004846 A2 | 1/2006 |
| WO | 2018165753 A1 | 9/2018 |

OTHER PUBLICATIONS

Wang et al. "Detect the rail track flaw by estimating the camera shaking," 17th International IEEE Conference on Intelligent Transportation Systems, Oct. 8-11, 2014, pp. 879-885, Qingdao, China.

Dudley, "Means For Recording the Conditions of and Marking Railway Tracks," U.S. Pat. No. 367,708; August 2, 1887, pp. 1-19.

Vohra et al. "Efficient Monitoring System for Railways for Crack Detection," 2nd International Conference on I-SMAC (IoT in Social, Mobile, Analytics, and Cloud), Aug. 30-31, 2018, pp. 676-681.

Faghih-Roohi, S. et al., "Deep Convolutional Neural Networks for Detection of Rail Surface Defects," 2016 International Joint Conference on Neural Networks (IJCNN), Jul. 24-29, 2016, pp. 2584-2589.

Nagata, F. et al., "Design Application of Deep Convolutional Neural Network for Vision-Based Defect Inspection," 2018 IEEE International Conference on Systems, Man, and Cybernetics (SMC), Oct. 7-10, 2018, pp. 1705-1710.

Papageorgiou, M. et al., "Transportation Systems 1997 (TS'97)," A Proceedings volume from the 8th IFAC/IFIP/IFORS Symposium, vol. 3, Published for the International Federation of Automatic Control, Jun. 18, 1997, pp. 1073-1076.

PCT International Application No. PCT/US2019/062145, international filing date Nov. 19, 2019, International Search Report and Written Opinion, 11 pages.

Anonymous ("Method For Analyzing Vehicle Wheel Assembly Rotational Movement Through Eulerian Video Magnification," IP.com, May 6, 2013) (Year: 2013).

Li et al. ("Improvements in Axle Box Acceleration Measurements for the Detection of Light Squats in Railway Infrastructure," IEEE Transactions on Industrial Electronics , vol. 62, Issue 7; Jul. 2015) (Year: 2015).

Chellaswamy et al. ("Optimized vehicle acceleration measurement for rail track condition monitoring," International Conference on Computing and Communications Technologies ; Date of Conference: Feb. 23-24, 2017) (Year: 2017).

Bonta et al. ("The Problem of Speed Measurements in the Slip-Slide Control for Electric Railway Traction," IEEE International Conference on Automation, Quality and Testing, Robotics; Date of Conference: May 25-28, 2006) (Year: 2006).

\* cited by examiner

COMPUTATIONAL HEURISTIC ENCODER ENHANCEMENT RELAY SYSTEM

CROSS-REFERENCE TO RELATED APPLICATIONS

The present application is Continuation-in-Part of U.S. patent application Ser. No. 17/810,441, filed Jul. 1, 2022, which is a is a Continuation of U.S. patent application Ser. No. 17/719,811, filed Apr. 13, 2022, which is a Continuation-in-Part of U.S. patent application Ser. No. 17/194,954, filed Mar. 8, 2021, which is a Continuation of U.S. patent application Ser. No. 16/196,990, filed Nov. 20, 2018, the entireties of which are herein incorporated by reference for all purposes.

TECHNICAL FIELD

The present invention relates generally to signal filtering, and more particularly to techniques for filtering encoder outputs for triggering image capturing devices.

BACKGROUND

Current machine vision systems of a locomotive to capture images of railroad assets and/or objects for object detection and/or inspection employ an image capturing device (e.g., a camera) that is triggered using a rotary encoder that is synchronized to the rotation of the wheels of the locomotive. The rotary encoder may be installed on an axle to which the wheel may be attached such that, as the wheel rotates over a railroad track, the rotary encoder may detect the rotational movement of the wheel and may trigger the image capturing device to capture images (e.g., images of the railroad track). The rotary encoder may trigger the image capturing device by providing a triggering signal that includes a square wave, where each pulse of the square wave represents an encoder trigger. Each encoder trigger may cause the image capturing device to capture an image. As the rotary encoder is synchronized to the rotational movement of the wheel, each encoder trigger represents a capture of a section of the railroad track. At high speeds, the image capturing device may be triggered at a high frequency. For example, as the wheel rotates rapidly at high speeds, the rotary encoder may output a high frequency triggering signal (e.g., a high frequency square wave) based on the high rotation of the wheel.

However, traditional axle-mounted rotary encoders may include some free mechanical play or motion, due to the mechanical attachment of the various components. For example, the axle box and the encoder to axle interface often have some mechanical play. Unwanted vibration and shaking while the wheel is rotating over the railroad track may cause the mechanical play to, unfavorably, cause the encoder to sense the unwanted movement and to incorrectly generate trigger pulses due to the shock and vibrations. These excess and/or random encoder triggers may manifest as large problems in captured image quality, especially those images captured when traversing gaps in a rail, a turnout, or a crossing diamond, among others. For example, the excess triggers may cause the camera to capture an image at the "wrong" time (e.g., a trigger may overlap with a previous trigger), which may cause a distorted image. Indeed, instead of a trigger signal of evenly spaced pulses at a desired sample rate, the excess encoder triggers may cause a trigger signal with trigger pulses at uneven rates.

Some solutions have been proposed to address the issues with the excess triggers from the rotary encoder. For example, some solutions provide mechanical devices that minimizes the free motion of the rotary encoder. However, these solutions do not completely eliminate the free motion of the rotary encoder. In addition, these solutions require installation of the mechanical device, which may require a maintenance shop, which may result in additional maintenance expenses, as well as regular inspections. These additional maintenance expenses may be significant as these may require the locomotive or train car in which the computer vision system is installed to be taken to a maintenance shop, which can incur costly expenses, along with wasted time from the operators requiring the maintenance shop environment. The operators incur opportunity costs from the wasted time.

SUMMARY

The present disclosure achieves technical advantages as systems, methods, and computer-readable storage media that provide functionality for filtering a trigger signal from an encoder for triggering an image capturing device. The present disclosure provides for a system integrated into a practical application with meaningful limitations that may enable the minimization or elimination of image artifacts causing distortion in an image captured based on a trigger from an encoder. The system may include a signal filter controller that may receive a trigger signal as an input signal from an encoder including a sequence of pulses for triggering the image capturing device, may determine an average pulse frequency of the trigger signal over a period of time based on sampling a number of pulses in the trigger signal over the period of time, may apply frequency restrictions to the average pulse frequency to generate a trigger frequency, may determine an output frequency based on the trigger frequency, and may outputting a pulse width modulation (PWM) signal for triggering the image capturing device, where the PWM signal may have a frequency based on the output frequency. In this manner, the system can enable a filtering of the "dirty" trigger signal from a rotary encoder, which may include a sequence of pulses unevenly spaced, to generate a "clean" trigger signal, which may include evenly spaced pulses, that may be used for triggering an image capturing device without being affected by excess movement of the rotary encoder (or the rotary encoder installation box) caused by excess vibration, motion, or shaking during operation. In addition, in some embodiments, the frequency restrictions applied by the signal filter controller to the average pulse frequency may include limiting the trigger frequency based on a configuration of the image capturing device, which may enable the system to handle the limitations of the image capturing device.

Accordingly, the present disclosure discloses concepts inextricably tied to computer technology such that the present disclosure provides the technological benefit of providing a mechanism for filtering a rotary encoder output for triggering an image capturing device. The present disclosure goes beyond a mere implementation of a manual process into a computer, providing a mechanism that is rooted in technology for synchronizing an image capturing device to a rotary encoder. The present disclosure can address the current challenges with rotary encoder and image capturing device synchronization, such as the issues caused by unnecessary or unwanted free motion, by providing a mechanism for ensuring that the trigger signal fed to the image capturing device is a clean pulse trigger signal that takes into account the free motion of the encoder, which may cause excess triggers in the direct output of the encoder. By addressing the excess triggers in the direct output of the encoder, the accuracy and operation of the computer vision system may be enhanced and improved.

The present disclosure solves the technological problem of a lack of technical functionality for filtering a trigger signal from an encoder for triggering an image capturing device. The technological solutions provided herein, and missing from conventional systems, are more than a mere application of a manual process to a computerized environment, but rather include functionality to implement a technical process to supplement current implementations of computer vision systems that use a rotary encoder to trigger an image capturing device. In doing so, the present disclosure goes well beyond a mere application the manual process to a computer.

It is an object of the invention to provide a system for filtering a trigger signal from an encoder for triggering an image capturing device. It is a further object of the invention to provide a method of filtering a trigger signal from an encoder for triggering an image capturing device. It is still a further object of the invention to provide a computer-based tool for filtering a trigger signal from an encoder for triggering an image capturing device. These and other objects are provided by the present disclosure, including at least the following embodiments.

In one particular embodiment, a method of filtering a trigger signal from an encoder for triggering an image capturing device is provided. The method includes receiving an input trigger signal from an encoder, the input trigger signal including a sequence of pulses for triggering the image capturing device, determining an average pulse frequency of the input trigger signal over a period of time based on detecting a number of pulses in the input signal over the period of time, applying restrictions to the average pulse frequency to generate a trigger output frequency, determining an output frequency based on the trigger output frequency, and outputting a PWM signal for triggering the image capturing device, the PWM signal having a frequency based on the output frequency.

In another embodiment, a computer-based tool for filtering a trigger signal from an encoder for triggering an image capturing device is provided. The computer-based tool may include non-transitory computer readable media having stored thereon computer code which, when executed by a processor, causes a computing device to perform operations. The operations include receiving an input trigger signal from an encoder, the input trigger signal including a sequence of pulses for triggering the image capturing device, determining an average pulse frequency of the input trigger signal over a period of time based on detecting a number of pulses in the input signal over the period of time, applying restrictions to the average pulse frequency to generate a trigger output frequency, determining an output frequency based on the trigger output frequency, and outputting a PWM signal for triggering the image capturing device, the PWM signal having a frequency based on the output frequency.

In still another embodiment, a system for filtering a trigger signal from an encoder for triggering an image capturing device is provided. The system comprises at least one processor and a memory operably coupled to the at least one processor and storing processor-readable code that, when executed by the at least one processor, is configured to perform operations. The operations include receiving an input trigger signal from an encoder, the input trigger signal including a sequence of pulses for triggering the image capturing device, determining an average pulse frequency of the input trigger signal over a period of time based on detecting a number of pulses in the input signal over the period of time, applying restrictions to the average pulse frequency to generate a trigger output frequency, determining an output frequency based on the trigger output frequency, and outputting a PWM signal for triggering the image capturing device, the PWM signal having a frequency based on the output frequency.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

Figure 1:
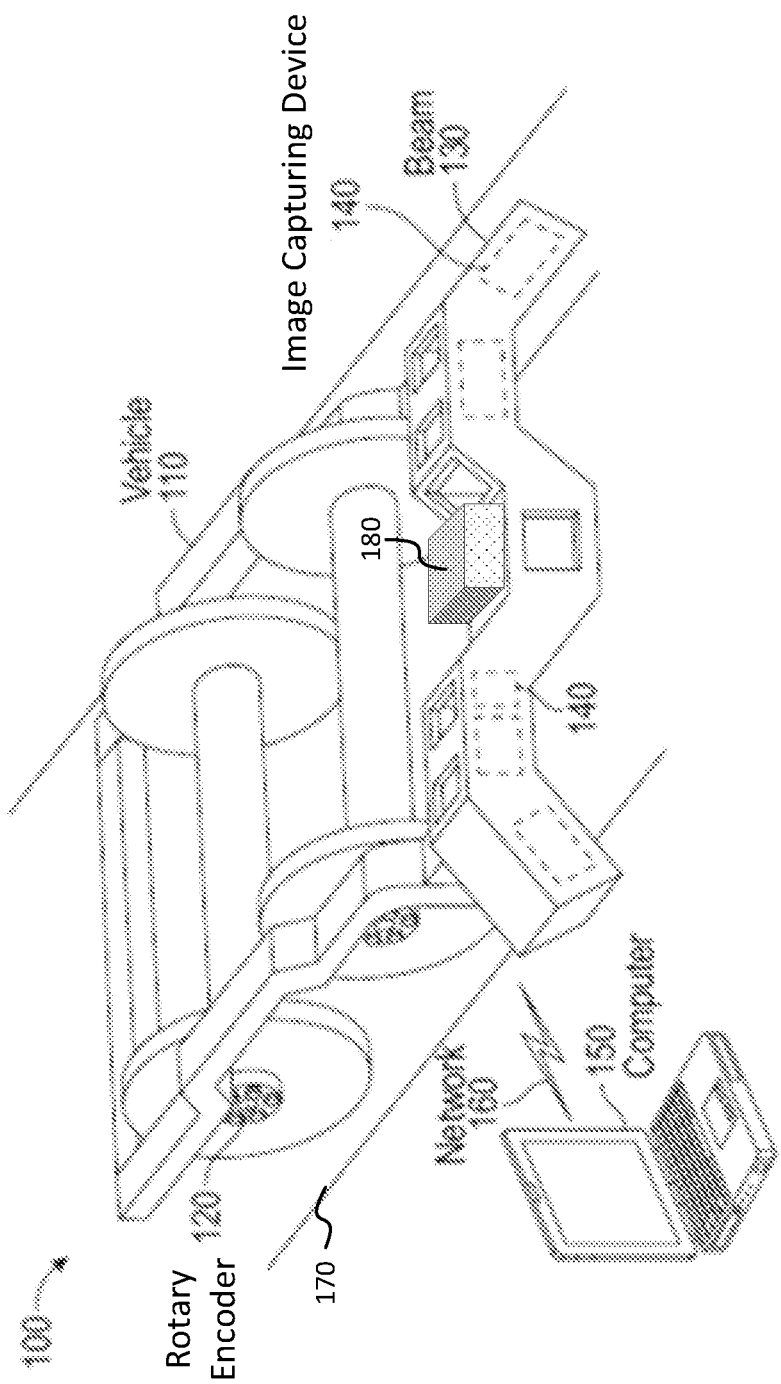
FIG. 1 illustrates an example system for image capturing implemented in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Various embodiments of the present disclosure are directed to systems and techniques that provide functionality for filtering a trigger signal from an encoder for triggering an image capturing device. In particular embodiments, a trigger signal may be received as an input signal from an encoder including a sequence of pulses for triggering the image capturing device. In embodiments, an average pulse frequency of the trigger signal over a period of time may be determined based on sampling a number of pulses in the trigger signal over the period of time, and frequency restrictions may be applied to the average pulse frequency to generate a trigger frequency. In embodiments, an output frequency may be determined based on the trigger frequency, and a pulse width modulation (PWM) signal having a frequency based on the output frequency may be determined for triggering the image capturing device.

In embodiments, the techniques disclosed herein may also include location tracking based on the rotary encoder output. In embodiments, a quadrature mode may be provided in which the image capturing device may be triggered only when a vehicle in which the system may be installed is traveling over a section of a railroad track that has not been previously sampled during a current operational session. For example, a PWM for triggering the image may be output to the image capturing device only when traveling over a section of a railroad track for which images have not yet been captured during a current operational session. When traveling over a section of railroad track for which images have been captured during the current operational section, the image capturing device may not be triggered (e.g., a PWM for triggering the image capturing device may not be output to the image capturing device, or the PWM for triggering the image capturing device may be output with an output frequency of zero). In embodiments, the quadrature mode may detect a direction of travel and may determine whether a section of railroad track has already been sampled during a current operational session. In embodiments, a basic mode may be provided in which the image capturing device may be triggered as long as the vehicle is moving, regardless of direction or section of the track being sampled.

It is noted that, although the disclosure that follows is focused on an example application in which a trigger signal from a rotary encoder for triggering an image capturing device is filtered, this is merely for illustrative purposes and not intended to be limiting in any way. Indeed, in some embodiments, the techniques described herein may be applicable for filtering other types of signals for other types of controls that may be affected by excess motion, vibrations, etc., or other types of environmental factors.

FIG. 1 illustrates an example system 100 for image capturing implemented in accordance with embodiments of the present disclosure. In embodiments, system 100 may be configured to capture images (e.g., using image capturing device 140) of railroad track 170 and/or components thereof, as vehicle 110 travels over railroad track 170. In embodiments, the captured images may be used for object detection, object inspection, etc.

In embodiments, system 100 or portions thereof may be associated with an entity, which may include any entity, such as a business, company (e.g., a railway company, a transportation company, etc.), or a government agency (e.g., a department of transportation, a department of public safety, etc.) that may capture images. The elements of the system 100 may be implemented using any suitable combination of hardware, firmware, and software.

As shown in FIG. 1, system 100 may include vehicle 110, rotary encoder 120, beam 130, one or more image capturing modules 140, computer 150, network 160, and trigger signal filter controller 180.

In embodiments, vehicle 110 may include any machine capable of automated and/or controlled movement. Vehicle 110 may include be a car, a locomotive, a train car, a truck, a bus, an aircraft, or any other machine suitable for mobility. Vehicle 110 may operate or travel at any speed that allows one or more components (e.g., sensors, cameras, etc.) of beam 130 to capture images as vehicle 110 travels. For example, vehicle 110 may be a rail bound vehicle that travels at high speeds (e.g., 40-75 miles per hour (mph)) over railroad track 170.

In embodiments, railroad track 170 may include any path that may accommodate vehicle 110. For example, vehicle 110 may travel along railroad track 170. Railroad track 170 may include a road, a highway, a railroad track, a water way, and the like.

In embodiments, beam 130 may include a structure that may contains and may orient components (e.g., image capturing device 140) used to capture images. In some embodiments, beam 130 may operate similar to a flatbed document scanner, but beam 130 may be in motion while capturing images of stationary physical objects, such as railroad track 170 and/or components thereof. Beam 130 may engage with vehicle 110. For example, beam 130 may be bolted to a sub-frame attached to vehicle 110. In the illustrated embodiment of FIG. 1, beam 130 has three sections that may include two end sections and a center section. Beam 130 may have a gullwing configuration such that the center section may ben inward toward the center of beam 130. The gullwing configuration may allow image capturing components (e.g., sensors, cameras, etc.) of image capturing device 140 within beam 130 to be properly oriented within with respect to the physical objects being captured. In certain embodiments, the center section of beam 130 may be omitted, and each end section may be operably coupled to vehicle 110. Beam 130 may be made of metal (e.g., steel or aluminum), plastic, or any other material suitable for housing components of beam 130 and for attaching beam 130 to vehicle 110.

Beam 130 may include one or more openings. Openings may provide for the placement of one or more image capturing device 140 within beam 130. Openings may allow for installation, adjustment, and maintenance of the one or more image capturing device 140. While beam 130 is illustrated in FIG. 1 as having a particular size and shape, beam 130 may have any size and shape suitable to house and orient the one or more image capturing device 140. Other factors that may contribute to the design of beam 130 may include shock resistance, vibration resistance, weatherproofing considerations, durability, ease of maintenance, calibration considerations, and ease of installation.

In another embodiment, beam 130 may include a plurality of sub-beams. For example, beam 130 may include two separate sub-beams, each including a plurality of cameras. In one embodiment, system 100 with the plurality of sub-beams may reduce complexity of maintenance and simplify construction of each of the sub-beams. In another embodiment, system 100 with the plurality of sub-beams may reduce complexity of maintenance by reducing a number of personnel needed resulting in the maintenance of control in construction tolerances. For example, the sub-beams may include 33% fewer welds and cuts to construct compared to a full beam.

In embodiments, one or more image capturing device 140 of system 100 may be used to capture images while vehicle 110 is in motion. Each of the one or more image capturing device 140 may include one or more sensors, one or more cameras, and the like. One or more image capturing device 140 may be attached to vehicle 110 at any location that may allow the one or more image capturing device 140 to capture images of the environment surrounding vehicle 110. In the illustrated embodiment of FIG. 1, the one or more image capturing device 140 may be located within beam 130.

In embodiments, each end section of beam 130 may house one or more image capturing device 140. For example, a first end section of beam 130 may house an image capturing module 140 that may include two downward facing cameras that may capture images of tie and ballast areas of a rail. The first end section of the beam 130 may house two downward facing cameras in a portion of the first end section that may be substantially horizontal to the rail. The second end section of beam 130 opposite the first end section may house two image capturing modules 140 that each may include two angled cameras that may capture images of both sides of the rail and rail fastening system. The second end section of beam 130 may house four angled cameras in portions of the second end section that may be at an angle (e.g., a 45 degree angle) to the rail.

In embodiments, image capturing device 140 may include various types of sensors depending on sensing and/or measuring requirements. Sensors housed by image capturing device 140 may include optical sensors (e.g., cameras for visible light (mono and color), infrared, UltraViolet, and/or thermal), motion sensors (e.g., gyroscopes and accelerometers), light detection and ranging (LIDAR) sensors, hyperspectral sensors, Global Positioning System (GPS) sensors, and the like. Optical sensors and lasers may be used together for laser triangulation to measure deflection or profile. LIDAR sensors may be used for generating three-dimensional (3D) point-cloud data. Hyperspectral sensors may be used for specific wavelength responses. An example of image capturing module 140 is described in FIG. 2 below.

Figure 2:
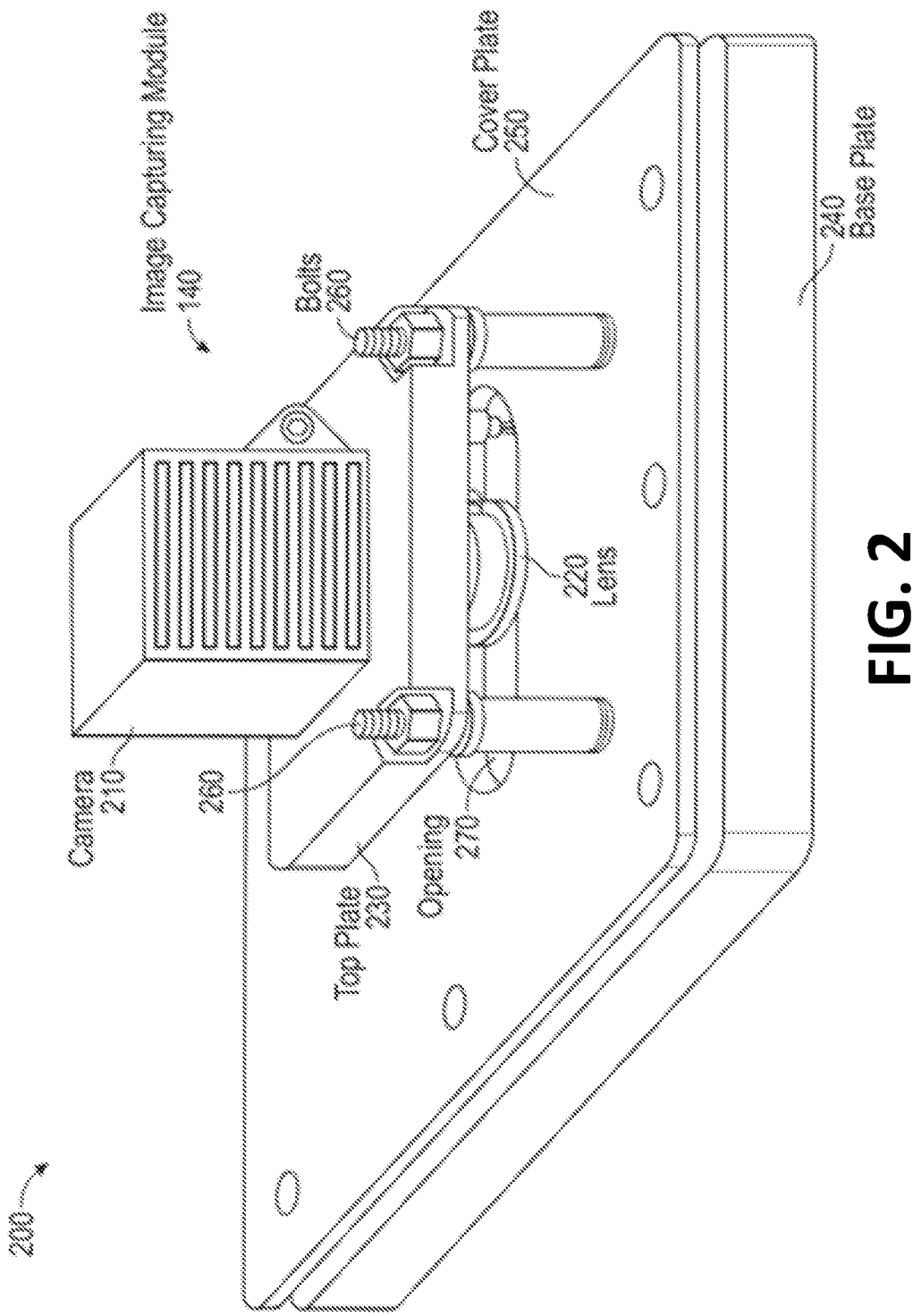
FIG. 2 illustrates an example image capturing device implemented in accordance with embodiments of the present disclosure.

FIG. 2 illustrates an example image capturing device 140 that may be used by system 100 of FIG. 1. Image capturing module 140 may include camera 210, lens 220, top plate 230, base plate 240, cover plate 250, bolts 260, and opening 270. In embodiments, camera 210 may be any device configured to capture images. For example, camera 210 may capture images of railroad components (e.g., a rail joint, a switch, a frog, a fastener, ballast, a rail head, and/or a rail tie). In some embodiments, camera 210 may include one or more sensors. In some embodiments, camera 210 may communicate with a memory for storing at least one of image in response to the camera receiving the trigger signal and a processor that may be configured to control operation of the camera and transmit the at least one image, by performing program steps.

In embodiments, camera 210 may include a line scan camera. A line scan camera may include a single row of pixels. In some embodiments, camera 210 may be a dual line scan camera. A dual line scan camera may include two rows of pixels that may be captured and/or processed simultaneously. In embodiments, as camera 210 moves over a physical object, camera 210 may capture images such that a complete image of the physical object can be reconstructed in software line by line. Camera 210 may have a capture rate up to 140 kilohertz. Camera 210 may have a resolution and optics to detect physical objects of at least $1/16$ inches in size. In some embodiments, camera 210 may include lens 220 that may be configured to focus and direct incident light to a sensor of camera 210. Lens 220 may be a piece of glass or other transparent substance. Lens 220 may be made of any suitable material (e.g., steel, aluminum, glass, plastic, or a combination thereof.)

Although FIG. 2 illustrates a particular arrangement of camera 210, lens 220, top plate 230, base plate 240, cover plate 250, bolts 260, and opening 270, this disclosure contemplates any suitable arrangement of camera 210, lens 220, top plate 230, base plate 240, cover plate 250, bolts 260, and opening 270. Although FIG. 2 illustrates a particular number of cameras 210, lenses 220, top plates 230, base plates 240, cover plates 250, bolts 260, and openings 270, this disclosure contemplates any suitable number of cameras 210, lenses 220, top plates 230, base plates 240, cover plates 250, bolts 260, and openings 270. For example, image capturing device 140 may include multiple cameras 210. As another example, in certain embodiments, image capturing device 140 may not include certain components (e.g., base plate 240) illustrated in FIG. 2.

With reference back to FIG. 1, rotary encoder 120 may include a rotary encoder or other timing device used to measure axle or wheel rotation. Rotary encoder 120 may operate to measure a number of times a wheel (or an axle to which the wheel may be attached) makes a revolution. Rotary encoder 120 may be operably coupled to a wheel or axle of vehicle 110. For example, in some embodiments, rotary encoder 120 may be mounted or installed onto an axle of vehicle 110 in such as manner as to remain attached to vehicle 110 while operating to measure a number of times a wheel or axle to which rotary encoder 120 may be mounted makes a revolution.

Rotary encoder 120 may be physically and/or logically connected to one or more components of the system 100. For example, rotary encoder 120 may be physically and/or logically connected to trigger signal filter controller 180. In additional or alternative embodiments, rotary encoder 120 may be physically and/or logically connected to one or more cameras and/or sensors of image capturing device 140 or to computer 150.

In embodiments, rotary encoder 120 may be configured to communicate with image capturing device 140 (e.g., via trigger signal filter controller 180) to ensure that a camera captures images of the same perspective and proportion regardless of the speed of travel of the vehicle 110. For example, rotary encoder 120 may be synchronized with multiple cameras of image capturing device 140 to ensure that all cameras are taking images at the same time. As another example, rotary encoder 120 may be synchronized with a camera of image capturing device 140 to ensure that a camera traveling with vehicle 110 at a first speed (e.g., 10 miles per hour) captures images that are the same perspective and proportion of a camera traveling with vehicle 110 at a second speed (e.g., 65 miles per hour).

In embodiments, rotary encoder 120 may couple with vehicle 110 in a mechanical manner to reduce or eliminate lost or unnecessary motion resulting in undesirable artifacts in images generated from image capturing device 140. For example, the lost or unnecessary motion may include slack in the mechanical coupling resulting in distortion in the images. In another embodiment, the mechanical manner may reduce the lost or unnecessary motion using components machined specifically for the rotary encoder. For example, the components machined specifically for the rotary encoder may ensure flexible and rigid fitting to minimize vibration and other mechanical interference resulting in the lost or unnecessary motion.

In embodiments, rotary encoder 120 may communicatively couple with image capturing device 140 in an electrical manner including via trigger signal filter controller 180. For example, as described in more detail below, trigger signal filter controller 180 may be configured to filter trigger signals generated by rotary encoder 120 and may send the filtered triggered signals to one or more cameras of image capturing device 140. In embodiments, the trigger signals generated by rotary encoder 120 may be "dirty," which may refer to the trigger signals including a square wave of uneven frequency, such as including pulses that are unevenly spaced. In embodiments, trigger signal filter controller 180 may be configured to clean the dirty trigger signals generated by rotary encoder 120 by smoothing the trigger filter signals generated by rotary encoder 120 to generate a clean trigger signal, which may refer to a trigger signal including a square wave having pulses that are evenly spaced with an even frequency. In addition, trigger signal filter controller 180 may be configured to apply minimum and/or maximum frequency limits to the trigger signal, such that the clean trigger signal output by trigger signal filter controller 180 may have hard limits on the minimum and/or maximum frequency.

In embodiments, computer 150 may be implemented as, or as part of, a mobile device, a smartphone, a tablet computing device, a personal computing device, a laptop computing device, a desktop computing device, a computer system of a vehicle, a personal digital assistant (PDA), a smart watch, another type of wired and/or wireless computing device, or any part thereof. Computer 150 may be configured to coordinate one or more components of system 100, and to receive data from trigger signal filter controller 180, image capturing device 140, and/or rotary encoder 120. In embodiments, computer 150 may monitor inputs and/or outputs of trigger signal filter controller 180, image capturing device 140, and/or rotary encoder 120. In some embodiments, computer 150 may include a communications function that may allow users (e.g., a technician) to engage system 100 directly. For example, a user may access computer 150 through an interface (e.g., a screen, a graphical user interface (GUI), or a panel) of computer 150. Computer 150 may be located inside or external to vehicle 110. Computer 150 may communicate with one or more components of the system 100 via the network 160.

Network 160 may include any type of network that facilitates communication between components of the system 100. One or more portions of network 160 may include an ad-hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a 3G network, a 4G network, a 5G network, a Long Term Evolution (LTE) cellular network, a combination of two or more of these, or other suitable types of networks. One or more portions of network 160 may include one or more access (e.g., mobile access), core, and/or edge networks. Network 160 may include any communications network, such as a private network, a public network, a connection through Internet, a mobile network, a Wi-Fi network, a Bluetooth network, etc. One or more components of system 100 may communicate over the network 160. For example, computer 150 may communicate over the network 160, including receiving information from trigger signal filter controller 180, image capturing device 140 and/or rotary encoder 120.

During operation of system 100, vehicle 110 may travel over railroad track 170 at a certain speed. The rotation of the wheels, and in some embodiments more particularly the rotation of the axle to which the wheels are attached, may cause rotary encoder 120 to generate a trigger signal. In embodiments, the trigger signal generated by rotary encoder 120 may include a square wave consisting of a number of pulses. In embodiments, the trigger signal generated by rotary encoder 120 may be used to trigger image capturing device 140 to capture images of railroad track 170 and/or components thereof. For example, each pulse of the trigger signal may trigger image capturing device to capture an image.

In embodiments, the number of pulses in the square wave generated by rotary encoder 120 may have a frequency indicating the number of pulses per second (or in some cases measured as number of pulses per revolution of the wheel) generated by rotary encoder 120. Ideally, the frequency of the pulses generated by rotary encoder 120 at a particular speed may be evenly spaced with a constant frequency. Such an evenly spaced trigger signal from rotary encoder 120 would ensure that image capturing device 140 may be triggered "evenly" such that the captured images may not be distorted. However, as mentioned above, mechanical play in the components of system 100, and in particular in the components used to attach rotary encoder 120 to the axle of vehicle 110 may cause the trigger signal generated by rotary encoder 120 to include random and/or excess pulses, which means that, typically, the trigger signal generated by rotary encoder 120 at a particular speed includes pulses that are not evenly spaced, but rather have varying frequencies or rates.

During operation, the trigger signal generated by rotary encoder 120 may be input into trigger signal filter controller 180, which may be configured to filter the signal generated by encoder 120 into a clean trigger signal including pulses that are evenly spaced. The clean trigger signal may then be provided to image capturing device 140 and may be used to trigger image capturing device 140 to capture images of railroad track 170 and/or components thereof. As the clean trigger signal includes a square wave with evenly spaced pulses, the images captured by image capturing device 140 may be distortion free and may not be impacted by the mechanical play of the attachment components of system 100.

In embodiments, location tracking functionality of trigger signal filter controller 180 may be used to provide a quadrature mode and a basic mode of operation. In embodiments, during operation in basic mode, system 100 may operate to sample railroad track 170 and/or components thereof (e.g., to capture images of railroad track 170 and/or components thereof) as long as vehicle 110 is moving in any direction. In basic mode, as vehicle 110 moves in any direction, rotary encoder 120 may generate pulses (e.g., in a square wave trigger signal) that may be filtered and/or cleaned by trigger signal filter controller 180 and then provided to image capturing device 140 to be used to trigger image capturing device 140 to capture images of railroad track 170 and/or components thereof, without consideration of the location of system 100 with respect to railroad track 170 or the direction in which vehicle 110 may be moving.

In embodiments, during operation in quadrature mode, system 100 may operate to sample portions of railroad track 170 and/or components thereof that have not been previously sampled during a current operational session without sampling portions of railroad track 170 and/or components thereof that have already been sampled during the current operational session. In quadrature mode, system 100 may leverage the functionality of trigger signal filter controller 180 to keep track of a location and direction of system 100 within railroad track 170 to keep track of sections of railroad track 170 and/or components thereof that have been sampled. In this manner, trigger signal filter controller 180 may pause triggering image capturing device 140 (e.g., may output no trigger signal to image capturing device 140 or may output a trigger signal with a frequency of zero to image capturing device 140) while image capturing device 140 is determined to be traveling over sections of railroad track 170 and/or components thereof that have already been sampled, and may resume triggering image capturing device 140 (e.g., may output a trigger signal having a frequency greater than zero to image capturing device 140) while image capturing device 140 is determined to be traveling over sections of railroad track 170 and/or components thereof that have not already been sampled.

Although FIG. 1 illustrates a particular arrangement of vehicle 110, rotary encoder 120, beam 130, image capturing device 140, computer 150, network 160, and trigger signal filter controller 180, this disclosure contemplates any suitable arrangement of vehicle 110, rotary encoder 120, beam 130, image capturing device 140, computer 150, network 160, and trigger signal filter controller 180. For example, computer 150 can be located inside vehicle 110. Vehicle 110, rotary encoder 120, beam 130, image capturing device 140, computer 150, and trigger signal filter controller 180 can be physically or logically co-located with each other in whole or in part.

Although FIG. 1 illustrates a particular number of vehicles 110, rotary encoders 120, beams 130, image capturing devices 140, computers 150, networks 160, and trigger signal filter controllers 180, this disclosure contemplates any suitable number of vehicles 110, rotary encoders 120, beams 130, image capturing devices 140, computers 150, networks 160, and trigger signal filter controllers 180. For example, system 100 can include a first beam at a front end of vehicle 110 and a second beam at a rear end of vehicle 110. As another example, system 100 can include multiple computers 150.

Figure 3:
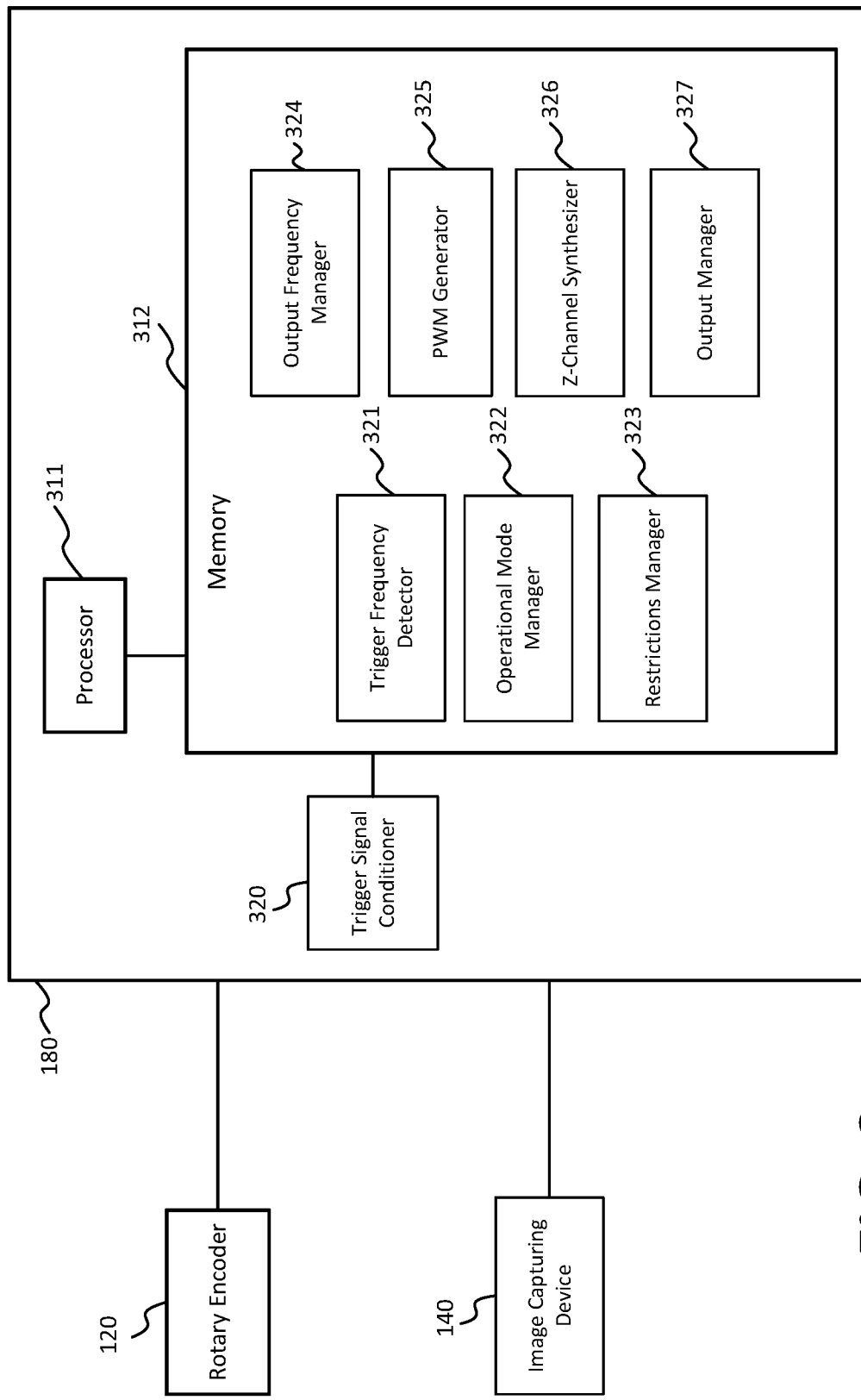
FIG. 3 shows a block diagram illustrating an example of a schematic view of trigger signal filter controller implemented in accordance with embodiments of the present disclosure.

FIG. 3 shows a block diagram illustrating an example of a schematic view of trigger signal filter controller 180 implemented in accordance with embodiments of the present disclosure. As seen in FIG. 3, trigger signal filter controller 180 may include processor 311, memory 312, trigger signal conditioner 320, trigger frequency detector 321, operational mode manager 322, restrictions manager 323, output frequency manager 324, PWM generator 325, Z-channel synthesizer 326, and output manager 327.

In embodiments, trigger signal filter controller 180 may be configured to filter trigger signals generated by a rotary encoder (e.g., rotary encoder 120 of FIG. 1) and to output a clean or filtered trigger signal to one or more image capturing devices (e.g., image capturing device 140 of FIG. 1). In additional or alternative embodiments, trigger signal filter controller 180 may be configured to apply minimum and/or maximum frequency limits to the trigger signal, such that the clean trigger signal output by trigger signal filter controller 180 may have hard limits on the minimum and/or maximum frequency. Furthermore, in additional or alternative embodiments, trigger signal filter controller 180 may be configured to provide a quadrature mode and a basic mode of operation. In embodiments, the basic mode of operation may enable a system (e.g., system 100 of FIG. 1) to sample a railroad track and/or components thereof as long as the vehicle in which the system is installed is moving in any direction, and regardless of location of the system within the railroad track. In embodiments, the quadrature mode of operation may enable a system to sample portions of the railroad track and/or components thereof that have not been previously sampled during a current operational session without sampling portions of the railroad track and/or components thereof that have already been sampled during the current operational session.

The functionality of trigger signal filter controller 180 may be provided by the cooperative operation of the various components of trigger signal filter controller 180, as will be described in more detail below. Although FIG. 3 shows a single trigger signal filter controller 180, it will be appreciated that trigger signal filter controller 180 and its individual functional blocks may be implemented as a single device or may be distributed over multiple devices having their own processing resources, whose aggregate functionality may be configured to perform operations in accordance with embodiments of the present disclosure. Furthermore, those of skill in the art would recognize that although FIG. 3 illustrates components of trigger signal filter controller 180 as single and separate blocks, each of the various components of trigger signal filter controller 180 may be a single component (e.g., a single application, server module, etc.), may be functional components of a same component, or the functionality may be distributed over multiple devices/components. In such embodiments, the functionality of each respective component may be aggregated from the functionality of multiple modules residing in a single, or in multiple devices. In addition, particular functionality described for a particular component of trigger signal filter controller 180 may actually be part of a different component of trigger signal filter controller 180, and as such, the description of the particular functionality described for the particular component of trigger signal filter controller 180 is for illustrative purposes and not limiting in any way.

Processor 311 may comprise a processor, a microprocessor, a controller, a microcontroller, a plurality of microprocessors, an application-specific integrated circuit (ASIC), an application-specific standard product (ASSP), or any combination thereof, and may be configured to execute instructions to perform operations in accordance with the disclosure herein. In some embodiments, implementations of processor 311 may comprise code segments (e.g., software, firmware, and/or hardware logic) executable in hardware, such as a processor, to perform the tasks and functions described herein. In yet other embodiments, processor 311 may be implemented as a combination of hardware and software. Processor 311 may be communicatively coupled to memory 312.

Memory 312 may comprise one or more semiconductor memory devices, read only memory (ROM) devices, random access memory (RAM) devices, one or more hard disk drives (HDDs), flash memory devices, solid state drives (SSDs), erasable ROM (EROM), compact disk ROM (CD-ROM), optical disks, other devices configured to store data in a persistent or non-persistent state, network memory, cloud memory, local memory, or a combination of different memory devices. Memory 312 may comprise a processor readable medium configured to store one or more instruction sets (e.g., software, firmware, etc.) which, when executed by a processor (e.g., one or more processors of processor 311), perform tasks and functions as described herein.

In embodiments, rotary encoder 120 may output a trigger signal that may include a square wave with a sequence of pulses while a vehicle upon which rotary encoder 120 may be installed travels over a roadway (e.g., a railroad track) at a certain speed. As noted above, the pulses in the trigger signal generated by rotary encoder 120 may be unevenly spaced, such that the pulse rate or trigger signal square wave frequency is uneven. As also noted above, this unevenness in the trigger signal from rotary encoder 120 may cause problems when used for triggering image capturing device 140 while traveling over a railroad track at the certain speed. The trigger signal output from rotary encoder 120 may be input as an input signal for trigger signal filter controller 180.

In embodiments, trigger signal conditioner 320 may be configured to condition the trigger signal received from rotary encoder 120. Conditioning the trigger signal received from rotary encoder 120 may include converting the trigger signal received from rotary encoder 120 into a form that may be compatible with other components of trigger signal filter controller 180. In some embodiments, trigger signal conditioner 320 may convert the trigger signal received from rotary encoder 120 into a voltage compatible with other components of trigger signal filter controller 180. For example, the trigger signal received from rotary encoder 120 may include a 5 volts square wave, and at least some components of trigger signal filter controller 180 may operate at 3.3 volts. In this example, trigger signal conditioner 320 may convert the 5V trigger signal received from rotary encoder 120 into a 3.3V square wave trigger signal compatible with components of trigger signal filter controller 180.

In additional or alternative embodiments, trigger signal conditioner 320 may be configured to condition the output of trigger signal filter controller 180 for compatibility with image capturing device 140. For example, image capturing device 140 may operate at 5V, such as using a 5V square wave, for triggering image captures. In this example, the clean trigger signal generated by trigger signal filter controller 180 may include a square wave with 3.3V pulses. In this example, trigger signal conditioner 320 may convert the 3.3V trigger signal generated by trigger signal filter controller 180 into a square wave with 5V pulses that may be then sent to image capturing device 140.

It is noted that, in embodiments, rotary encoder 120 may include a quadrature encoder that may be configured to output a trigger signal that may include more than one sub-signals, such as an A signal and a B signal. Both the A signal and the B signal may be a square wave including a sequence of pulses having the same frequency, but with a phase difference (e.g., a phase difference between 25%-50%). In some embodiments, the trigger signal output by rotary encoder 120 may include one or both of the A signal and the B signal from rotary encoder 120. In embodiments, the square wave at each of A signal and B signal may have an approximately 50% duty cycle.

In embodiments, trigger frequency detector 321 may be configured to measure or determine a frequency (e.g., an input frequency) of the trigger signal output by rotary encoder 120. In embodiments, trigger frequency detector 321 may determine a frequency of the trigger signal output by rotary encoder 120 over a sample period of time. For example, trigger frequency detector 321 may analyze the trigger signal output by rotary encoder 120 to determine a number of pulses occurring in the trigger signal over the sample period of time. Trigger frequency detector 321 may determine the frequency of the trigger signal output by rotary encoder 120 over the sample period of time by dividing the number of pulses detected over the sample period of time. In this manner, trigger frequency detector 321 may operate to average a frequency of the trigger signal over the sample period of time.

In particular, trigger frequency detector 321 may be configured to attach an interrupt that executes a handling function in response to a detection of an edge on one of the signals (e.g., A signal or B signal) from rotary encoder 120. The interrupt is attached for the duration of the sample period of time. At the expiration of the sample period of time, the interrupt may be detached, and the handling function may no longer be executed when the edge is detected on one of the signals from rotary encoder 120. For example, trigger frequency detector 321 may attach an interrupt that executes a handling function when a falling edge is detected in the B signal from rotary encoder 120. The handling function may be configured to record the time at which the detected edge of the B signal (e.g., representing a pulse) was detected as well as the number of pulses detected in the B signal during the period of time the interrupt is attached (e.g., the sample period of time). At the expiration of the sample period of time, trigger frequency detector 321 may detach the interrupt. At this point, a number of total pulses detected during the period of time the interrupt was attached is known, as well as the times at which the first pulse and the last pulse were detected during the time the interrupt was attached. Trigger frequency detector 321 may calculate an input frequency of the trigger signal generated by encoder 120 by dividing the total number of pulses detected during the period of time the interrupt was attached by the difference between the times at which the first pulse and the last pulse were detected. The result may represent an averaging of the frequency of the square wave of the B signal over the sample period of time. In addition, the resultant average trigger signal may address any random pulses in the trigger signal from the rotary encoder by, in effect, spreading the effect of the random pulses over the sample period of time. The resultant average trigger signal frequency may be used, as shown in more detail below, to generate a trigger signal of a constant or even frequency that may be output to image capturing device 140.

It is noted that the description of executing the handling function when a falling edge is detected in the B signal from rotary encoder 120 is merely for illustrative purposes and should not be construed as limiting in any way. Indeed, in some embodiments, the handling function may be executed when a falling or rising edge in the B signal or the A signal is detected.

Operational mode manager 322 may be configured to implement multiple operational modes and to set limits on using the input frequency of the trigger signal output by rotary encoder 120, as calculated by trigger frequency detector 321, based on the operational modes. In embodiments, the operational modes may include a basic mode and a quadrature mode. In the basic mode, trigger signal filter controller 180 may output a filtered trigger signal to image capturing device 140 regardless of the direction of travel or location of the system within the railroad track. In this manner, as long as the vehicle in which system 100 may be installed moves within the railroad track, and as long as rotary encoder 120 generates a trigger signal, trigger signal filter controller 180 may filter the trigger signal from rotary encoder 120 and may provide the filtered trigger signal to image capturing device 140 for image capturing. In the quadrature mode, trigger signal filter controller 180 may output a filtered trigger signal to image capturing device 140 dependent on the direction of travel and the location of the system within the railroad track. In a particular implementation of the quadrature mode trigger signal filter controller 180 may output a filtered trigger signal to image capturing device 140 when the location and direction of travel indicates that image capturing device is traveling over portions of the railroad track and/or components thereof that have not been previously sampled during the current operational session, and may not output a filtered trigger signal to image capturing device 140, or may output a filtered trigger signal of frequency zero, when the location and direction of travel indicates that image capturing device is traveling over portions of the railroad track and/or components thereof that have been previously sampled during the current operational session. A particular situation in which quadrature mode may be used may include when a vehicle in which image capturing device 140 may be installed may be traveling in a first direction over the railroad track sampling the railroad track but may stop at a particular location and may reverse direction. In this case, quadrature mode may allow for the image capturing to be paused while the vehicle is reversing over the track (over portions already sampled). The pausing may continue even if the vehicle resumes in the original direction until the vehicle returns to the original location at which the sampling was stopped. At this point, the vehicle may be over portions of the railroad track that have not been sampled previously (since the vehicle stop at this point and reverse direction) and the sampling may resume.

In embodiments, the operational modes may include a sampling direction mode. The sampling direction mode may be used to control the direction of travel in which sampling of the railroad track and/or components thereof is enabled. For example, locomotives typically are configured to be able to travel in any direction. As such, most railcars may travel with either end of the railcar leading. As one end of a rail vehicle may be referred to as the B end (e.g., the end that includes the hand brake) and the other end of the rail vehicle may be referred to as the A end, a vehicle may travel over a railroad track with the A end leading or with the B end leading. The sampling direction mode may allow for selection of which direction (e.g., A end leading or B end leading) sampling is to occur. For example, an operator may indicate that sampling is to be performed when the vehicle is traveling with A end leading. In this case, trigger signal filter controller 180 may output a filtered trigger signal to image capturing device 140 when the direction of travel of the rail vehicle is determined to be A end leading. In this case, when the direction of travel of the rail vehicle is determined to be B end leading, trigger signal filter controller 180 may not output a filtered trigger signal to image capturing device 140, or may output a filtered trigger signal of frequency zero.

It is noted that, in some embodiments, the various may not be mutually exclusive. For example, in some embodiments, quadrature mode may be used along with sampling direction mode, in which case the railroad track may be sampled when the vehicle is traveling in the appropriate direction and only when traveling over sections of tracks not previously sampled. On another example, basic mode may be used along with sampling direction mode, in which case the railroad track may be sampled when the vehicle is traveling in the appropriate direction, whether or not traveling over sections of tracks previously sampled.

In embodiments, operational mode manager 322 may implement the various modes of operations by tracking a direction of travel and a current location. In embodiments, operational mode manager 322 may track a direction of travel based on a phase difference between the A signal and the B signal of the trigger signal received from rotary encoder 120. As mentioned above, the A signal and the B signal may have a phase difference (e.g., a phase difference between 25%-50%) between each other. In embodiments, the configuration of the phase difference may depend on the direction of rotation of the axle or wheel to which rotary encoder 120 may be attached. For example, when the axle or wheel to which rotary encoder 120 may be attached rotates in a first direction, the A signal may lead the B signal. As such, when the A signal rises, the B signal may be low. Only after the phase difference does B signal rises and both the A signal and the B signal may be high. The A signal may then fall, but the B signal may remain high, and after the phase difference, the B signal may fall at which point both the A signal and the B signal may be low. On the other hand, when the axle or wheel to which rotary encoder 120 may be attached rotates in a second direction opposite the first direction, the A signal may trail the B signal. As such, when the A signal rises, the B signal may already be high. After the phase difference, the B signal falls, but the A signal remains high. The A signal may then fall, at which point both the A signal and the B signal may be low. After the phase difference, the B signal may rise again, but the A signal remains low.

In embodiments, operational mode manager 322 may be configured to attach an interrupt that executes a handling function in response to a detection of an edge on one of the signals (e.g., A signal or B signal) from rotary encoder 120. For example, operational mode manager 322 may attach an interrupt that executes a handling function when a rising edge is detected in the A signal from rotary encoder 120. The handling function may be configured to, upon detecting that the A signal has gone high (e.g., has risen), determine whether the B signal is low or high. When the handling function detects that the B signal is low, the handling function determines that the wheel or axle to which rotary encoder is attached is rotating in a first rotational direction, and thus, the vehicle upon which the wheel or axle is moving in a first direction. In some embodiments, the first rotational direction may be a counterclockwise direction and, based on the installation configuration of rotary encoder 120, the first direction of the vehicle may be with A end leading. On the other hand, when the handling function detects that the B signal is high, the handling function determines that the wheel or axle to which rotary encoder is attached is rotating in a second rotational direction, and thus, the vehicle upon which the wheel or axle is moving in a second direction different from the first direction. In some embodiments, the second rotational direction may be a clockwise direction and, based on the installation configuration of rotary encoder 120, the second direction of the vehicle may be with B end leading. In this manner, operational mode manager 322 may operate to determine a direction of travel.

In embodiments, operational mode manager 322 may track a current location based on a number of pulses and the direction of travel. In embodiments, the handling function of the interrupt attached by operational mode manager 322 may be configured to keep a pulse count. The pulse count may be dependent on the direction of travel. For example, in some embodiments, the first direction of travel may represent a count up direction and the second direction of travel may represent a count down direction. When in the count up direction, the handling function may, for each detected pulse (e.g., each detection of the A signal rising or falling, or each detection of the B signal rising or falling), increase the pulse count. However, when in the count down direction, the handling function may, for each detected pulse, decrease the pulse count. In this manner, the pulse count may be directly related to the location of the vehicle within the track, as when the vehicle moves in the first direction (e.g., the count up direction), the pulse count is increased, but when it moves in the opposite direction (e.g., the second direction or the count down direction), the pulse count is decreased. The current pulse count may represent the current "location" of the vehicle within the railroad track, at least in terms of pulses.

In embodiments, operational mode manager 322 may leverage the pulse count for implementing the quadrature mode. For example, operational mode manager 322 may keep a maximum distance count, which may include a pulse count in a particular direction (e.g., the count up or count down direction) at the maximum distance reached in the particular direction. As the maximum distance count also represents the maximum location within the railroad track that has been sampled, the maximum distance count may be used to determine whether the current location (e.g., the current pulse count) of the vehicle is over a section of the railroad track already sampled or not. For example, the vehicle may be traveling in the count up direction in quadrature mode and configured for sampling in the count up direction (e.g., may be in count up quadrature mode). The vehicle may stop at a first point in the railroad track. The current pulse count may correspond to the location of the first point in the railroad track. Operational mode manager 322 may set the maximum distance count to be equal to the current pulse count. In this manner, the maximum distance count may correspond to the first point in the railroad track. The vehicle may begin traveling in the opposite direction (e.g., the count down direction). As the system is in quadrature mode, image capturing device is not to capture images of the railroad track while moving in reverse as that section of the railroad track, up to the first point, has already been sampled. Therefore, sampling of the railroad track may be paused. However, while moving in the reverse direction, operational mode manager 322 may decrease the pulse count by each pulse detected in the reverse direction. In this example, the pulse count may be less than the maximum distance count, but may still represent a location within the railroad track, albeit a location already sampled. Once the vehicle stops reversing and begins moving in the original direction (e.g., the count up direction), operational mode manager 322 may again increase the pulse count by each pulse detected. However, at this point the current pulse count may still be less than the maximum distance count, as the first location has not yet been reached, and sampling of the railroad track may remain paused. When the first location is reached, however, the pulse count may be equal to the maximum distance count, and once the pulse count exceeds the maximum distance reached, sampling of the railroad track may resume, and operational mode manager 322 may set the maximum distance count to the current pulse count. In embodiments, operations in quadrature mode and for sampling in the count down direction (e.g., count down quadrature mode) may be similar to operations in the count up quadrature mode, except that sampling is paused until the current pulse count is less than the maximum distance count.

In embodiments, operational mode manager 322 may limit the use of the input frequency of the trigger signal output by rotary encoder 120, as calculated by trigger frequency detector 321, based on the operational modes. For example, when operating in quadrature mode, operational mode manager 322 may limit the use of the input frequency of the trigger signal output by rotary encoder 120, as calculated by trigger frequency detector 321, when the current pulse count indicates that the location of the vehicle within the railroad track is over a section of the railroad track already sampled (e.g., when the current pulse count is not less than the maximum distance count when in the count down quadrature mode, or when the current pulse count is not more than the maximum distance count when in the count up quadrature mode). Operational mode manager 322 may limit the use of the input frequency of the trigger signal output by rotary encoder 120, as calculated by trigger frequency detector 321, by overriding the input frequency to be equal to a value indicating that quadrature mode is being used, but the vehicle is not beyond the maximum reached distance. For example, when in count up quadrature mode and the current pulse count is less than the maximum distance count, operational mode manager 322 may override the input frequency to be equal to a value (e.g., a positive value) indicating that the system is in count up quadrature mode but the current location of the vehicle is behind the maximum distance (e.g., in the count up direction) reached previously. This indication may be used to maintain the pause in the sampling of the railroad track, as the currently location has already been sampled. In the same example, when in count down quadrature mode and the current pulse count is greater than the maximum distance count, operational mode manager 322 may override the input frequency to be equal to a value (e.g., a negative value) indicating that the system is in count down quadrature mode but the current location of the vehicle is behind the maximum distance (e.g., in the count down direction) reached previously. This indication may be used to maintain the pause in the sampling of the railroad track, as the currently location has already been sampled.

Restrictions manager 323 may be configured to apply frequency restrictions to the input frequency of the trigger signal output by rotary encoder 120, as calculated by trigger frequency detector 321. In embodiments, the frequency restrictions may be related to operational requirements and/or limitations. For example, restrictions manager 323 may apply a minimum frequency limit to the input frequency of the trigger signal output by rotary encoder 120, as calculated by trigger frequency detector 321. In this case, if the input frequency of the trigger signal output by rotary encoder 120, as calculated by trigger frequency detector 321, is less than the minimum frequency limit, restrictions manager 323 may override the input frequency and set it to zero. In this manner, unless the input frequency of the trigger signal output by rotary encoder 120, as calculated by trigger frequency detector 321, is above the minimum frequency limit, the trigger signal output by trigger signal filter controller 180 to image capturing device 140 may be zero. This may occur when the vehicle may be traveling at a slow rate of speed, in which case the frequency of the trigger signal may be less than the minimum frequency limit. In some embodiments, restrictions manager 323 may override the input frequency and set it to zero when the total pulses detected in the trigger signal output by rotary encoder 120 over the sample period of time may be less than a minimum number of pulses (e.g., less than 5 pulses).

In embodiments, restrictions manager 323 may apply a maximum frequency limit to the input frequency of the trigger signal output by rotary encoder 120, as calculated by trigger frequency detector 321. In this case, if the input frequency of the trigger signal output by rotary encoder 120, as calculated by trigger frequency detector 321, is greater than the maximum frequency limit, restrictions manager 323 may override the input frequency and set it to the maximum frequency limit. In this manner, unless the input frequency of the trigger signal output by rotary encoder 120, as calculated by trigger frequency detector 321, is below a maximum frequency limit, the trigger signal output by trigger signal filter controller 180 to image capturing device 140 may be set to the maximum frequency limit. In embodiments, the maximum frequency limit may correspond to a maximum operating frequency limit of the image capturing device 140.

Output frequency manager 324 may be configured to set the output frequency of the trigger signal to be output by trigger signal filter controller 180. In embodiments, when the input frequency of the trigger signal output by rotary encoder 120, as calculated by trigger frequency detector 321, is between the minimum frequency limit and the maximum frequency limit, output frequency manager 324 may set the output frequency to be equal to the trigger signal output by rotary encoder 120, as calculated by trigger frequency detector 321. In embodiments, when the input frequency of the trigger signal output by rotary encoder 120, as calculated by trigger frequency detector 321, is outside the minimum frequency limit or the maximum frequency limit, output frequency manager 324 may set the output frequency to be equal to the overridden input frequency, as overridden by restrictions manager 323.

PWM generator 325 may be configured to generate a square wave having a frequency equal to the output frequency set by output frequency manager 324. In some embodiments, generating the square wave may include causing a PWM having the output frequency and a duty cycle of 50% to be generated. The square wave generated by PWM generator 325 may represent a filtered trigger signal having evenly spaced pulses in accordance with the output frequency, and with consideration of operational frequency limitations and/or restrictions. In embodiments, output manager 327 may be configured to ensure that the filtered trigger signal is output to image capturing device 140. In some embodiments, output manager 327 may also output operational messages indicating operational events, such as measured input frequencies, pulse counts, maximum distance counts, direction of travel, operational modes, etc.

Figure 4:
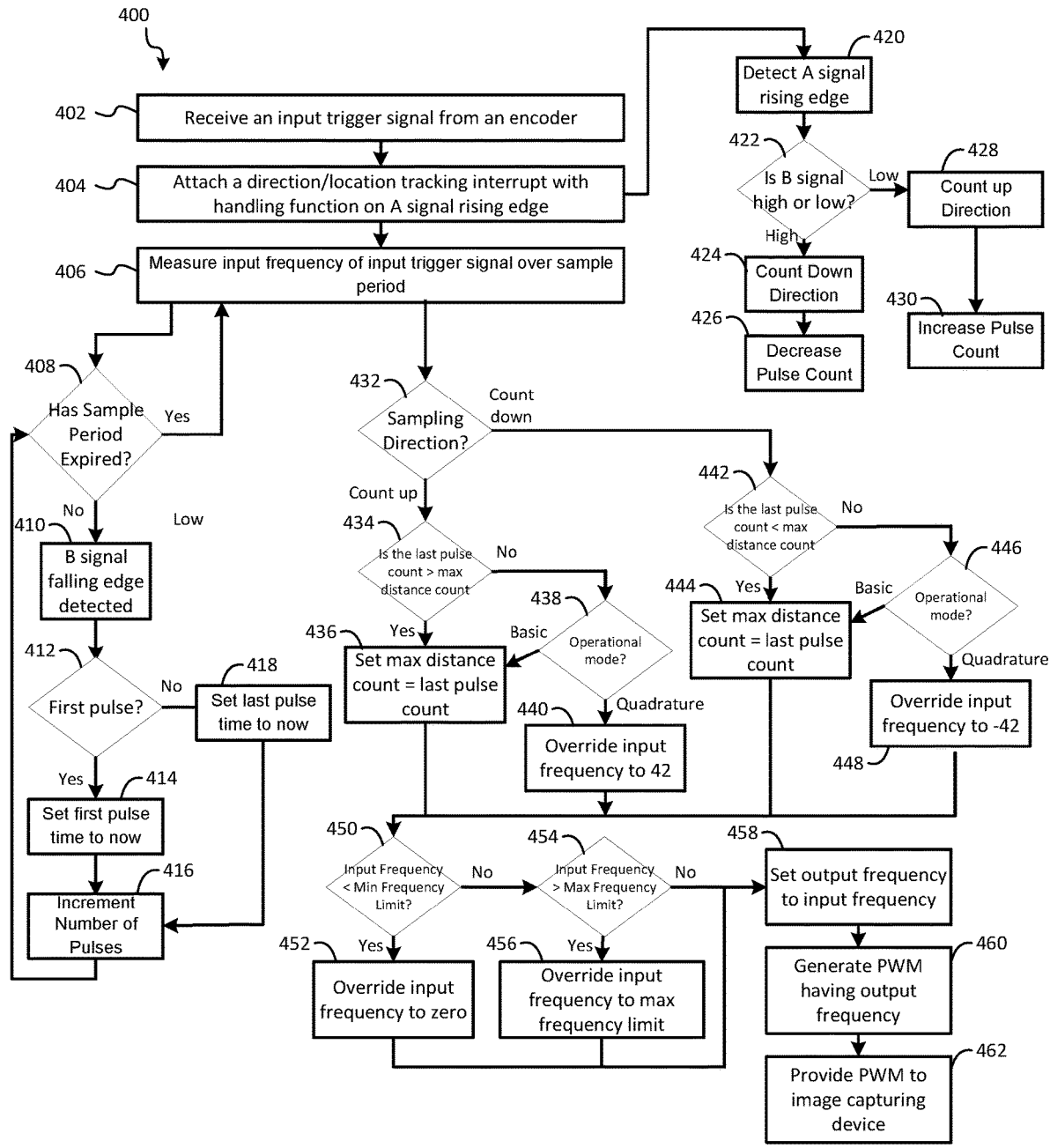
FIG. 4 illustrates an example of an operational flow of a trigger signal filter controller implemented in accordance with embodiments of the present disclosure.

FIG. 4 illustrates an example of an operational flow 400 of a trigger signal filter controller implemented in accordance with embodiments of the present disclosure. The operational flow 400 may be implemented as an algorithm on trigger signal filter controller (e.g., trigger signal filter controller 180 of FIG. 1), a machine learning module, a client, a database, or other suitable system. Additionally, operational flow 400 may implement or incorporate one or more features of trigger signal filter controller 180. The steps of operational flow 400 may be achieved with software, firmware, hardware, an application programming interface (API), a network connection, a network transfer protocol, HTML, DHTML, JavaScript, Dojo, Ruby, Rails, other suitable applications, or a suitable combination thereof.

At step 402, in an embodiments, an input trigger signal may be received from an encoder (e.g., rotary encoder 120 of FIG. 1). The input trigger signal may include a sequence of pulses generated by the encoder in response to rotational movement of an axle to which the encoder may be attached. In embodiments, the pulses in the sequence of pulses of the input trigger signal may not all be evenly spaced, and may include pulses that are unevenly spaced within the input trigger signal. In embodiments, the input trigger signal may include an A signal and a B signal.

At step 404, in an embodiment, the trigger signal filter controller may attach a direction/location tracking interrupt that may be configured to execute a handling function when a rising edge of the A signal of the input trigger signal. In embodiments, the handling function, upon detection of a rising edge of the A signal, such as at step 420, may determine whether the B signal is low or high (e.g., at step 422). At step 424, in one embodiment, the trigger signal filter controller may determine that a direction in which the vehicle is traveling is in the count down direction when the B signal is high at 422. In this case, the count down direction may be determined based on a determination that both the A signal and the B signal are high. In this case, at step 426, the current pulse count may be decreased in response to the detection of the pulse in the A signal (e.g., the rising edge in the A signal) and a determination that the vehicle is moving in the count up direction.

At step 428, in one embodiment, the trigger signal filter controller may determine that a direction in which the vehicle is traveling is in the count up direction when the B signal is low at 422. In this case, the count up direction may be determined based on a determination that the B signal is low when the A signal is high. In this case, at step 430, the current pulse count may be increased in response to the detection of the pulse in the A signal (e.g., the rising edge in the A signal) and a determination that the vehicle is moving in the count up direction.

At block 406, in one embodiment, the trigger signal filter controller may execute logic to measure the input frequency of the input trigger signal over a sample period of time. In embodiments, the trigger signal filter controller may attach an interrupt that executes a handling function in response to a detection of a falling edge in the B signal. In embodiments, the interrupt is attached for the duration of the sample period of time and, upon expiration of the sample period of time, the trigger signal filter controller may detach the interrupt, and the handling function may no longer be executed when the falling edge in the B signal is detected. For example, after attaching the interrupt, the trigger signal filter controller, at step 408, may determine whether the sample period of time has expired. In response to a determination that the sample of period of time has not expired, the trigger signal filter controller may, at step 410, detect a falling edge in the B signal of the input trigger signal from the encoder. At step 412, in one embodiment, the trigger signal filter controller may determine, based on a number of pulses counter, whether the current pulse detected in the B signal is the first pulse detected during the sample period of time. Based on a determination that the current pulse detected in the B signal is the first pulse detected during the sample period of time, the trigger signal filter controller, at step 414, may obtain a current time and may set the first pulse time to the current time. Based on a determination that the current pulse detected in the B signal is not the first pulse detected during the sample period of time, the trigger signal filter controller, at step 418, may obtain a current time and may set the last pulse time to the current time. At step 416, the trigger signal filter controller may increment the number of pulses counter, and at operations may return to step 408 to determine whether the sample period of time has expired. Operations at steps 408-418 may continue until a determination, at step 408, that the sample period of time has expired. Based on a determination that the sample period of time has expired, operations may return to step 406, at which the trigger signal filter controller may measure the input frequency of the input trigger signal over the sample period of time.

In particular, at step 406, at the expiration of the sample period of time, the trigger signal filter controller may detach the interrupt. At this point, a number of total pulses detected during the period of time the interrupt was attached is known, as the number of pulses counter, as well as the times at which the first pulse and the last pulse were detected during the time the interrupt was attached (e.g., in the first pulse time and the last pulse time). The trigger signal filter controller may calculate an input frequency of the input trigger signal by dividing the total number of pulses detected during the period of time the interrupt was attached by the difference between the times at which the first pulse and the last pulse were detected. The result may represent an averaging of the frequency of the square wave of the B signal over the sample period of time. In addition, the resultant average trigger signal may address any random pulses in the trigger signal from the rotary encoder by, in effect, spreading the effect of the random pulses over the sample period of time. The resultant average trigger signal frequency may be used, as shown in more detail below, to generate a trigger signal of a constant or even frequency that may be output to image capturing device 140.

At step 432, in one embodiment, the trigger signal filter controller may determine a sampling direction in which images of the railroad track and/or components thereof are to be captured by the image capturing device. In embodiments, the sampling direction may be specified by an operator. Determining the sampling direction at this time may be important, as the direction of travel may be known (e.g., from the handling function of the direction/location tracking interrupt attached at step 404) and whether or not the input frequency measured at step 406 may be used may be based on whether the traveling direction of the vehicle corresponds to the sampling direction or not. In embodiments, determining the sampling direction may include reading an input attached to an indicator that an operator may use to indicate the desired sampling direction. In embodiments, the trigger signal filter controller may maintain a last pulse count that may be updated to equal to the current pulse count each time a pulse is detected by the handling function of the direction/location tracking interrupt. In this manner, the last pulse count may indicate the last current pulse count. The trigger signal filter controller may also maintain a maximum distance count that may indicate the pulse count at the maximum distance reached in a particular direction. The maximum distance count is related to the sampling direction in that the maximum distance count in the count down direction is the lowest pulse count reached, which may correspond to the maximum distance reached in the count down direction. On the other hand, the maximum distance count in the count up direction is the highest pulse count reached, which may correspond to the maximum distance reached in the count up direction.

When the sampling direction is determined to be in the count up direction at step 432, the trigger signal filter controller may, at step 434, in one embodiment, determine whether the last pulse count is greater than the maximum distance count. When the trigger signal filter controller determines, at step 434, that the last pulse count is greater than the maximum distance count, the trigger signal filter controller, at step 436, sets the maximum distance count to the last pulse count, as this may indicate that the distance represented by the maximum distance count prior to the execution of step 436 may be shorter than the distance represented by the last pulse count. Operations may then proceed to step 450. However, when the trigger signal filter controller determines, at step 434, that the last pulse count is not greater than the maximum distance count, indicating that the vehicle is traveling in a section of railroad track already traveled or sampled, the trigger signal filter controller may determine, at step 438, whether the trigger signal filter controller is operating in basic mode or quadrature mode. When the trigger signal filter controller determines to be operating in basic mode, the trigger signal filter controller executes operations of step 436 to set the maximum distance count to the last pulse count. Operations may then proceed to step 450. However, when the trigger signal filter controller determines to be operating in quadrature mode, the trigger signal filter controller overrides the input trigger frequency and sets it to a value (e.g., positive 42) indicating that the trigger signal filter controller is operating in quadrature mode but a "new" section of railroad track has not been reached (e.g., a section of railroad track not previously sampled). Operations may then proceed to step 450.

When the sampling direction is determined to be in the count down direction at step 432, the trigger signal filter controller may, at step 442, in one embodiment, determine whether the last pulse count is less than the maximum distance count. When the trigger signal filter controller determines, at step 442, that the last pulse count is less than the maximum distance count, the trigger signal filter controller, at step 444, sets the maximum distance count to the last pulse count, as this may indicate that the distance represented by the maximum distance count prior to the execution of step 444 may be shorter than the distance represented by the last pulse count. Operations may then proceed to step 450. However, when the trigger signal filter controller determines, at step 442, that the last pulse count is not less than the maximum distance count, indicating that the vehicle is traveling in a section of railroad track already traveled or sampled, the trigger signal filter controller may determine, at step 446, whether the trigger signal filter controller is operating in basic mode or quadrature mode. When the trigger signal filter controller determines to be operating in basic mode, the trigger signal filter controller executes operations of step 444 to set the maximum distance count to the last pulse count. Operations may then proceed to step 450. However, when the trigger signal filter controller determines to be operating in quadrature mode, the trigger signal filter controller overrides the input trigger frequency and sets it to a value (e.g., negative 42) indicating that the trigger signal filter controller is operating in quadrature mode but a "new" section of railroad track has not been reached (e.g., a section of railroad track not previously sampled). Operations may then proceed to step 450.

At step 450, in one embodiment, the trigger signal filter controller may determine whether the input frequency is less than a minimum frequency limit. When the trigger signal filter controller determines, at step 450, that the input frequency is less than the minimum frequency limit, the trigger signal filter controller may, at step 452, may override the input frequency and set it to zero. However, when the trigger signal filter controller determines, at step 450, that the input frequency is not less than the minimum frequency limit, the trigger signal filter controller may not override the input frequency and set it to zero.

At step 454, in one embodiment, the trigger signal filter controller may determine whether the input frequency is greater than a maximum frequency limit. When the trigger signal filter controller determines, at step 454, that the input frequency is greater than the maximum frequency limit, the trigger signal filter controller may, at step 456, may override the input frequency and set it to the maximum frequency limit. However, when the trigger signal filter controller determines, at step 454, that the input frequency is not greater than the minimum frequency limit, the trigger signal filter controller may not override the input frequency and set it to the maximum frequency limit.

At step 458, in one embodiment, the trigger signal filter controller may set an output frequency to the input frequency and at step 460, in one embodiment, the trigger signal filter controller may generate a PWM signal, such as a square wave including a sequence of pulses, having a frequency equal to the output frequency. In embodiments, the PWM signal may be generate with a duty cycle of 50%. In embodiments, the PWM signal may represent a filtered trigger signal of the input trigger signal from the encoder, with the PWM signal having evenly spaced pulses in accordance with the output frequency, and with consideration of operational frequency limitations and/or restrictions. At step 462, in one embodiment, the PWM signal may be provided to an image capturing device (e.g., image capturing device 140 of FIG. 1).

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). For example, the terms "processor" and "controller" can be a class of structures, rather than one specific structure, and may be defined with functional terms, but that does not make it means-plus-function. Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various embodiments of the present disclosure may be combined or performed in ways other than those illustrated and described herein.

Functional blocks and modules in FIGS. 1-4 may comprise processors, electronics devices, hardware devices, electronics components, logical circuits, memories, software codes, firmware codes, etc., or any combination thereof. Consistent with the foregoing, various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal, base station, a sensor, or any other communication device. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. The terms Disk and disc can include compact disc (CD), laser disc, optical disc, digital versatile disc (DVD), floppy disk, and Blu-ray disc where disks usually reproduce data magnetically, while discs usually reproduce data optically with lasers. Combinations of the above should also be included within the scope of computer-readable media.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function, in substantially the same way, or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of filtering a trigger signal from an encoder for triggering an image capturing device, comprising:
   receiving an input trigger signal from an encoder, the input trigger signal including a sequence of pulses for triggering the image capturing device;
   determining an average pulse frequency of the input trigger signal over a period of time based on detecting a number of pulses in the input signal over the period of time;
   applying restrictions to the average pulse frequency to generate a trigger output frequency;
   determining an output frequency based on the trigger output frequency; and
   outputting a pulse width modulation (PWM) signal for triggering the image capturing device, the PWM signal having a frequency based on the output frequency.

2. The method of claim 1, wherein at least a subset of the sequence of pulses in the input trigger signal are unevenly spaced within the input trigger signal.

3. The method of claim 1, wherein the PWM signal includes a plurality of pulses evenly spaced within the PWM signal according to the output frequency.

4. The method of claim 1, wherein detecting the number of pulses in the input signal over the period of time includes:
   executing a handling function during the period of time, the handling function including:
     detecting an edge of a sub-signal of the input trigger signal, the detection of the edge of the sub-signal representing a detection of a pulse within the sub-signal;
     setting a first pulse time to a current time when the pulse within the sub-signal is determined to be a first pulse detected during the period of time;
     setting a last pulse time to a current time when the pulse within the sub-signal is determined not to be a first pulse detected during the period of time; and
     incrementing a number of pulses counter;
   discontinuing execution of the handling function upon expiration of the period of time; and
   setting the number of pulses in the input signal over the period of time to be equal to the number of pulses counter after expiration of the period of time.

5. The method of claim 4, wherein determining the average pulse frequency of the input trigger signal over the period of time includes dividing the number of pulses in the input signal over the period of time by the difference between the last pulse time and the first pulse time.

6. The method of claim 1, wherein applying restrictions to the average pulse frequency to generate the trigger output frequency includes generating the trigger output frequency based on an operational mode, wherein the operational mode includes one or more of: a sampling direction mode, a basic mode, and a quadrature mode.

7. The method of claim 6, wherein generating the trigger output frequency based on the sampling direction mode includes:
   determining a direction of travel of a vehicle onto which the image capturing device is installed;
   comparing the direction of travel of the vehicle with a sampling direction indicated by an operator for capturing images;

overriding the trigger output frequency to zero when the direction of travel of the vehicle does not match the sampling direction indicated by the operator for capturing images; and foregoing overriding the trigger output frequency to zero when the direction of travel of the vehicle matches the sampling direction indicated by the operator for capturing images.

8. The method of claim 6, wherein generating the trigger output frequency based on the quadrature mode includes:

maintaining a current pulse count initiated at a start of a current operational session, wherein the current pulse count is configured to track a location of a vehicle onto which the image capturing device is installed within a railroad track;

maintaining a maximum distance pulse count indicating a pulse count of the current pulse when a maximum distance was reached in a first direction;

comparing the maximum distance pulse count to the current pulse count to determine whether the vehicle is traveling over a section of the railroad track previously sampled;

overriding the trigger output frequency to zero when the comparison of the maximum distance pulse count to the current pulse count indicates that the vehicle is traveling over a section of the railroad track previously sampled; and foregoing overriding the trigger output frequency to zero when the comparison of the maximum distance pulse count to the current pulse count indicates that the vehicle is traveling over a section of the railroad track not previously sampled.

9. The method of claim 8, wherein comparing the maximum distance pulse count to the current pulse count to determine whether the vehicle is traveling over a section of the railroad track previously sampled includes:

determining a sampling direction for capturing images;

determining that the vehicle is traveling over a section of the railroad track previously sampled when the sampling direction includes a count up direction and the maximum distance pulse count is greater than or equal to the current pulse count; and determining that the vehicle is traveling over a section of the railroad track previously sampled when the sampling direction includes a count down direction and the maximum distance pulse count is less than or equal to the current pulse count.

10. The method of claim 8, wherein tracking the location of the vehicle within the railroad track using the current pulse count includes:

incrementing the current pulse count in response to a pulse detection in the input trigger signal when the vehicle is determined to be moving in a first direction; and decrementing the current pulse count in response to the pulse detection in the input trigger signal when the vehicle is determined to be moving in a second direction opposite the first direction, wherein the current pulse count indicates a relative location within the railroad track in terms of pulses.

11. A system for filtering a trigger signal from an encoder for triggering an image capturing device, the system comprising:

at least one processor; and a memory operably coupled to the at least one processor and storing processor-readable code that, when executed by the at least one processor, is configured to perform operations including:

receiving an input trigger signal from an encoder, the input trigger signal including a sequence of pulses for triggering the image capturing device;

determining an average pulse frequency of the input trigger signal over a period of time based on detecting a number of pulses in the input signal over the period of time;

applying restrictions to the average pulse frequency to generate a trigger output frequency;

determining an output frequency based on the trigger output frequency; and outputting a pulse width modulation (PWM) signal for triggering the image capturing device, the PWM signal having a frequency based on the output frequency.

12. The system of claim 11, wherein at least a subset of the sequence of pulses in the input trigger signal are unevenly spaced within the input trigger signal.

13. The system of claim 11, wherein the PWM signal includes a plurality of pulses evenly spaced within the PWM signal according to the output frequency.

14. The system of claim 11, wherein detecting the number of pulses in the input signal over the period of time includes:

executing a handling function during the period of time, the handling function including:

detecting an edge of a sub-signal of the input trigger signal, the detection of the edge of the sub-signal representing a detection of a pulse within the sub-signal;

setting a first pulse time to a current time when the pulse within the sub-signal is determined to be a first pulse detected during the period of time;

setting a last pulse time to a current time when the pulse within the sub-signal is determined not to be a first pulse detected during the period of time; and incrementing a number of pulses counter;

discontinuing execution of the handling function upon expiration of the period of time; and setting the number of pulses in the input signal over the period of time to be equal to the number of pulses counter after expiration of the period of time.

15. The system of claim 14, wherein determining the average pulse frequency of the input trigger signal over the period of time includes dividing the number of pulses in the input signal over the period of time by the difference between the last pulse time and the first pulse time.

16. The system of claim 11, wherein applying restrictions to the average pulse frequency to generate the trigger output frequency includes generating the trigger output frequency based on an operational mode, wherein the operational mode includes one or more of: a sampling direction mode, a basic mode, and a quadrature mode.

17. The system of claim 16, wherein generating the trigger output frequency based on the quadrature mode includes:

maintaining a current pulse count initiated at a start of a current operational session, wherein the current pulse count is configured to track a location of a vehicle onto which the image capturing device is installed within a railroad track;

maintaining a maximum distance pulse count indicating a pulse count of the current pulse when a maximum distance was reached in a first direction;

comparing the maximum distance pulse count to the current pulse count to determine whether the vehicle is traveling over a section of the railroad track previously sampled;

overriding the trigger output frequency to zero when the comparison of the maximum distance pulse count to the current pulse count indicates that the vehicle is traveling over a section of the railroad track previously sampled; and foregoing overriding the trigger output frequency to zero when the comparison of the maximum distance pulse count to the current pulse count indicates that the vehicle is traveling over a section of the railroad track not previously sampled.

18. The system of claim 17, wherein comparing the maximum distance pulse count to the current pulse count to determine whether the vehicle is traveling over a section of the railroad track previously sampled includes:

determining a sampling direction for capturing images;

determining that the vehicle is traveling over a section of the railroad track previously sampled when the sampling direction includes a count up direction and the maximum distance pulse count is greater than or equal to the current pulse count; and determining that the vehicle is traveling over a section of the railroad track previously sampled when the sampling direction includes a count down direction and the maximum distance pulse count is less than or equal to the current pulse count.

19. The system of claim 17, wherein tracking the location of the vehicle within the railroad track using the current pulse count includes:

incrementing the current pulse count in response to a pulse detection in the input trigger signal when the vehicle is determined to be moving in a first direction; and decrementing the current pulse count in response to the pulse detection in the input trigger signal when the vehicle is determined to be moving in a second direction opposite the first direction, wherein the current pulse count indicates a relative location within the railroad track in terms of pulses.

20. A computer-based tool for filtering a trigger signal from an encoder for triggering an image capturing device, the computer-based tool including non-transitory computer readable media having stored thereon computer code which, when executed by a processor, causes a computing device to perform operations comprising:

receiving an input trigger signal from an encoder, the input trigger signal including a sequence of pulses for triggering the image capturing device;

determining an average pulse frequency of the input trigger signal over a period of time based on detecting a number of pulses in the input signal over the period of time;

applying restrictions to the average pulse frequency to generate a trigger output frequency;

determining an output frequency based on the trigger output frequency; and outputting a pulse width modulation (PWM) signal for triggering the image capturing device, the PWM signal having a frequency based on the output frequency.

* * * * *